United States Patent
Lu et al.

(10) Patent No.: US 6,793,908 B2
(45) Date of Patent: Sep. 21, 2004

(54) METHOD FOR PREPARING ITO NANOMETER POWDERS

(75) Inventors: Hsin Chung Lu, Taipei (TW); Chio Hao Hsu, Taipei Hsien (TW); I Chiao Lin, Taipei (TW); Chien Lung Weng, Taipei Hsien (TW)

(73) Assignee: Cheng Loong Corporation, Taipei Hsien (TW)

( * ) Notice: Subject to any disclaimer, the term of this patent is extended or adjusted under 35 U.S.C. 154(b) by 314 days.

(21) Appl. No.: 10/141,127

(22) Filed: May 9, 2002

(65) Prior Publication Data

US 2003/0211032 A1 Nov. 13, 2003

(51) Int. Cl.$^7$ .......................... C01G 15/00; C01G 19/00
(52) U.S. Cl. ...................... 423/594.9; 423/92; 423/93; 423/98; 423/115; 252/520.1
(58) Field of Search ................. 423/594.9, 92, 423/93, 98, 115; 252/520.1

(56) References Cited

U.S. PATENT DOCUMENTS 6,051,166 A * 4/2000 Fujiwara et al. .......... 252/520.1
6,096,285 A * 8/2000 Hayashi et al. ............. 423/618

\* cited by examiner

*Primary Examiner*—Steven Bos
(74) *Attorney, Agent, or Firm*—Rosenberg, Klein & Lee

(57) ABSTRACT

A solution method for preparing indium-tin oxide (ITO) powders is provided. Indium compounds and tin compounds are dissolved in water respectively to form two solution bodies. Some proper additives are added into the solution bodies to form metal hydroxyl compounds with determined composition. After water washing and filtration, proper additives are added into the solution to peptize the solution. During the peptization process, hydrolysis and condensation reactions occurs between different metal hydroxyl compounds. Solvent of the solution is then removed to form high quality nanometer grade ITO powders.

12 Claims, 2 Drawing Sheets

METHOD FOR PREPARING ITO NANOMETER POWDERS

BACKGROUND OF THE INVENTION

1. Field of the Invention

The present invention relates to a "solution" method for preparing indium tin oxide (ITO) fine powders, and more particularly, to a method for preparing ITO nanometer grade powders using different starting material sources.

2. Description of the Prior Art

The mixture of indium oxide powder and tin oxide powders, or indium tin oxide powders, i.e., the ITO powders are used as raw materials for ITO sputtering targets. To obtain high quality and high density ITO sputtering targets, nanometer grade ITO powders with uniform composition are required.

ITO is known as an N-type semiconductor material that is composed of indium oxide incorporated with tin. When a indium ion is replaced by a tin ion in the lattice, a free electron is released to preserve charge neutrality and therefore the electrical conductivity of ITO is enhanced.

ITO sputtering targets are typically used in the formation of transparent, conductive ITO films. Since ITO films have the properties of high transmittance to visible light and high infrared (IR) reflectivity, they are widely applied in the fields such as solar cells, flat panel displays, photo-detectors, transparent heating devices, anti-static coatings, electromagnetic protection coatings, and transparent electrodes for liquid crystal displays (LCD).

Various methods have been developed to manufacture ITO films. Some of these well-known methods include vacuum coating, magnetic sputtering, chemical vapor deposition (CVD), and dip coating. The sputtering method is most frequently used due to the fact that it is suitable for large area coating and that it has some environmental merits such as low energy consumption and free of toxic substances during sputtering processes.

In a sputtering process, atoms are sputtered by bombarding the target with high-energy ion beams. These sputtered atoms are then deposited or coated on a substrate in a vacuum environment. The properties of the target such as purity, composition, density, microstructure, diameter distribution, etc. will thus determine the quality of the coated films.

ITO targets are manufactured by pressing and molding the ITO powders to a predetermined shape. The solid-state pressing process may be hot isostatic or cold isostatic pressing. After pressing and molding, the green bodies are sintered to produce ITO targets. The ITO powders are manufactured by mechanically mixing indium oxide powders with a predetermined composition ratio by such a method as ball milling known in the art, the mixture powders are then dried and calcined to form ITO powders.

A problem with the above prior art is that the homogeneity of the mixture of the target is limited and hard to control due to such factors as impurities in the starting materials, composition of the starting materials and their particle size distribution. Therefore, ITO thin film properties such as conductivity, transmittance, and adhesion ability to the substrate are affected.

A proposal of forming high-purity ITO ultrafine powders for sputtering targets is known as "solution" method. According to a prior art of solution method, selected metallic compounds are dissolved in water. After some proper treatments known in the art, the dissolved metallic compounds react and polymerize into particles with higher molecular weight and finally form a stably suspended aqueous solution. After removing the solvent of the suspended aqueous solution by heat, high-purity ITO ultrafine powders are obtained.

However, the "solution" method, like the solid-state process mentioned above, still suffers from the inability to precisely control the powder composition. Consequently, there is a strong need to develop an improved method to solve the above-mentioned problems. The fabrication method described in this invention is much simplified and suitable for different starting material sources and industrial mass production.

SUMMARY OF THE INVENTION

The primary objective of the present invention is to provide an improved "solution" method for preparing ITO fine powders used to produce sputtering targets.

According to the claimed invention, a solution method for preparing ITO fine powders is provided. The solution method comprises the following steps:

a. Dissolution: dissolve indium compounds and tin compounds in water respectively to form two solution bodies;

b. Mixing: Mix the two solution bodies by stirring;

c. Precipitation: adding proper amount of alkaline reagents to adjust pH value of the admixed solution in step b to an extent that the precipitation completes;

d. Water washing and filtration: Water in the solution processed by step a through c is removed by using filtration method, a white filter cake is then obtained after filtration, wherein the white filter cake is re-dispersed in de-ionized (DI) by stirring, and wherein step d is repeated at least two times;

e. Peptization: the suspended solution after treated by water wash step is then mixed with proper amount of acids to control the pH value of the solution in a proper range, and then stirring to peptize the solution for a determined time period;

f. Drying: the peptized solution in step e is then dried up to obtain white powders of indium tin hydroxide (ITH); and g. Calcination: the dry ITH powders are then placed into a high temperature oven, wherein under proper clacining conditions such as temperature heating rate, calcination temperature and calcination time, ITO powders are obtained.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENTS

This invention provides an improved "solution" method for making ITO fine powders. Inorganic salts are used as starting materials for preparing stably suspended aqueous solutions. According to the present invention, the inorganic salts may be obtained from one of the following aspects: 1) metals dissolved by acids; 2) spent targets dissolved by acids; and 3) commercially available inorganic salts.

When preparing the aqueous solution that uses inorganic salts as starting materials, the inorganic metallic salts react in the water. Hydrolysis and condensation reactions take place in the aqueous solution. The cationic metal constituents first react with water molecules and produce ionic complex, followed by hydrolysis and then nucleophilic substitution and nucleophilic addition reactions. In this stage, suspended polymeric particles having M-O-M' bonding type are produced. Thereafter, after adding some proper alkaline reagents, the M-O-M' bonding type polymers are transferred into M(OH) and M'(OH) hydroxyl type suspended particles. To prevent further aggregation reactions, proper amount of acids are added into the aqueous solution containing M(OH) and M'(OH) hydroxyl type suspended particles.

Figure 1:
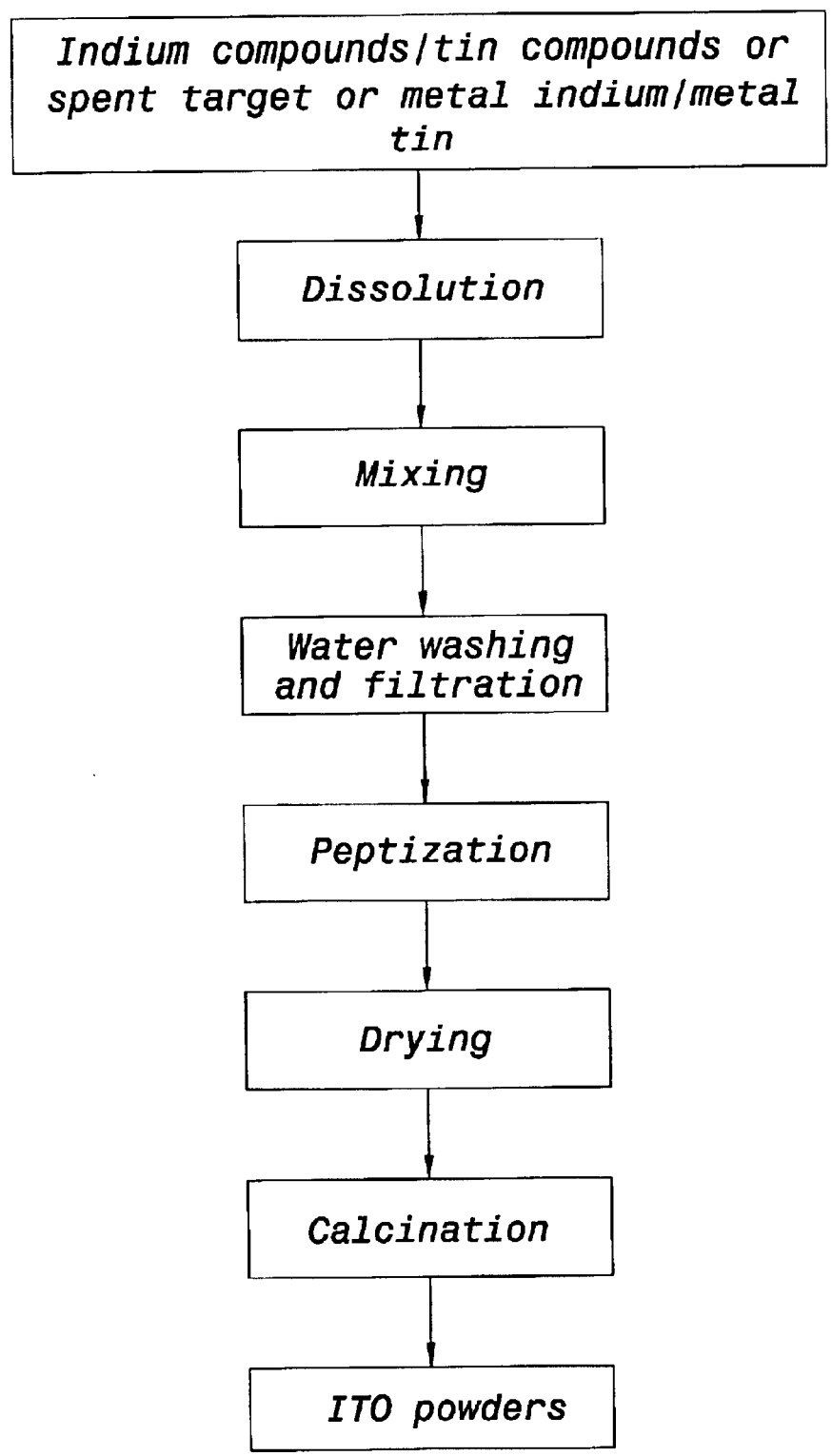
FIG. 1 is a block diagram of this invention.

Referring to FIG. 1 of block diagram of this invention. The steps are explained as follows:

a. Dissolution: proper amount of indium compound and tin compound are dissolved in water, respectively. Both of the ion concentration of indium and the ion concentration of tin range from 0.1M to 5.0M. The aqueous solution containing indium and tin may be prepared by dissolving metal indium and metal tin by acids or dissolving spent target by acids, then mixing with proper amount of pure water. The acids may be concentrated nitric acid, hydrochloric acid, or mixture of concentrated nitric acid and hydrochloric acid in a proper proportion;

b. Mixing: combining the above two clear solution and stirring;

c. Precipitation: adding proper amount of alkaline reagents to adjust pH value of the admixed solution in step b to an extent that precipitation completes. The concentration of the alkaline reagents ranges from 1N to 12N. The pH value ranges from 3 to 9. The alkaline reagents may be ammonia or alkylated ammonium compounds such as tetramethyl ammonium hydroxide;

d. Water washing and filtration: Water in the solution processed by step a through c is removed by using filtration method, a white filter cake is then obtained after filtration, wherein the white filter cake is re-dispersed in DI water by stirring, and wherein step d is repeated at least two times;

e. Peptization: the suspended solution after treated by step d is then mixed with proper amount of acids to control the pH value of the solution in a proper range, and then stirred to peptize the solution for a determined time period. The concentration of the acids ranges from 1N to 15N. The pH value is adjusted in the range of from 1 to 6. The determined time period is between 2 to 72 hours. The acids may be nitric acid, hydrochloric acid, acetic acid, oxalic acid, or formic acid.

f. Drying: the peptized solution in step e is then dried up to obtain white powders of indium tin hydroxide (ITH). The drying method may be heating or spray drying; and g. Calcination: the dry ITH powders are then placed into a high temperature oven. Under proper clacining conditions such as heating rate, calcination temperature, and calcination time, ITO powders are obtained. The calcination conditions ranges from heating the ITH powders at 1 to 20° C./min to a temperature of between 300° C. and 1100° C. and holding for 0.5 to 5 hours.

First Embodiment (Commercial Inorganic Salts)

a. 50.05 g indium nitrate (including a crystalline water, purity 99.99%, molecular weight 318.85) is dissolved in water to form a 155 mL clear solution and 5.67 g tin chloride (including five crystalline water, purity 99%, molecular weight 350.50) is dissolved in water to form a 16 mL clear solution. Both of the concentration of indium and tin in the two solution bodies is 1.0M;

b. Mixing the two solution bodies and stirring. In this stage, the molar ratio of indium to tin is 9:1;

c. In the stirring status, rapidly adding 35 mL concentrated (25 wt %) ammonia into the admixed solution to adjust the pH value of the admixed solution to 7.25. Upon reaching the pre-selected pH, the clear solution turns into white solution and precipitants produce;

C1. The solution containing white precipitants is stirred for at least 12 hours;

d. Water in the solution processed by step a through c1 is removed by using depressure-filtration method. A white filter cake is then obtained after filtration. The white filter cake is re-dispersed in de-ionized(DI) water by stirring. This step is repeated three times. After finishing the last filtration, the filter cake is re-dispersed in DI water to form suspended solution having a total volume of 180 mL;

e. 3 mL concentrated nitric acid (70 wt %) is added into the suspended solution of step d to adjust pH of the solution to 3.58 and the solution is stirred for 24 hours;

e1 According to particle size analysis, the diameter of the particles in the solution is 153 nm;

f. After drying the peptized suspended solution of step e by spray drying method, white indium tin hydroxide (ITH) powders are obtained. In this case, 320.61 g of ITH powders are obtained. The loss ratio according to TG analysis is about 28.1%; and g. The white ITH powders are placed into the high-temperature oven and calcined under the following conditions: heating rate 10° C./min to 800° C. for 3 hours. After calcining, ITO powders are obtained.

Second Embodiment (Commercial Inorganic Salts Made from Metals)

a. 25.02 g indium metal (purity 99.99%, molecular weight 114.8) is dissolved in 100 mL concentrated nitric acid (70 wt %) and then adding proper amount of water to form a 218 mL clear solution. 7.94 g tin chloride (including five crystalline water, purity 99%, molecular weight 350.50) are dissolved in water to form a 22 mL clear solution. Both of the concentration of indium and tin in the two solution bodies is 1.0M;

b. Mixing the two solution bodies by stirring. In this stage, the molar ratio of indium to tin is 9:1;

c. In a stirring status, rapidly adding 75 mL concentrated (25 wt %) ammonia into the admixed solution to adjust the pH value of the admixed solution to 7.11. Upon reaching the pre-selected pH, the clear solution turns into white solution and precipitants produce;

C1. The solution containing white precipitants is stirred for at least 12 hours;

d. Water in the solution processed by step a through c1 is removed by using filtration method. A white filter cake is then obtained after filtration. The white filter cake is re-dispersed in de-ionized (DI) water by stirring. This step is repeated three times. After finishing the last filtration, the filter cake is re-dispersed in DI water to form suspended solution having a total volume of 240 mL;

e. 5 mL concentrated nitric acid (70 wt %) is added into the suspended solution of step d to adjust pH of the solution to 3.42 and the solution is stirred for 24 hours;

e1 According to diameter analysis the diameter of the particles in the solution is 142 nm;

f. After drying the peptized suspended solution of step e by spray drying method, white indium tin hydroxide (ITH)

powders are obtained. In this case, 43.18 g of ITH powders are obtained. The loss ratio according to TG analysis is about 25.54%; and g. The white ITH powders are placed into the high-temperature oven and calcined under the following conditions: heating rate 10° C./min to 800° C. for 3 hours. After calcining, ITO powders are obtained.

Third Embodiment (Commercial Inorganic Salts Made from Metals Dissolved with Acids) (Prior Art Comparative Embodiment)

a. 25.11 g indium metal (purity 99.99%, molecular weight 114.8) is dissolved in 100 mL concentrated nitric acid (70 wt %) and then adding proper amount of water to form a 218 mL clear solution. 7.96 g tin chloride (including five crystalline water, purity 99%, molecular weight 350.50) are dissolved in water to form a 22 mL clear solution. Both of the concentration of indium and tin in the two solution bodies is 1.0M;

b. Mixing the two solution bodies by stirring. In this stage, the molar ratio of indium to tin is 9:1;

c. In a stirring status, rapidly adding 100 mL concentrated (25 wt %) ammonia into the admixed solution to adjust the pH value of the admixed solution to 7.16. Upon reaching the pre-selected pH, the clear solution turns into white solution and precipitants produce;

C1. The solution containing white precipitants is stirred for at least 12 hours;

d. Water in the solution processed by step a through c1 is removed by using filtration method. A white filter cake is then obtained after filtration. The white filter cake is re-dispersed in DI water by stirring. This step is repeated three times. After finishing the last filtration, the filter cake is re-dispersed in DI water to form suspended solution having a total volume of 240 mL;

e. The suspended solution is stirred for 24 hours without adjusting its pH value;

e1 According to particle size analysis the diameter of the particles in the solution is 2350 nm;

f. After drying the peptized suspended solution of step e by spray drying method, white indium tin hydroxide (ITH) powders are obtained. In this case, 43.18 g of ITH powders are obtained. The loss ratio according to TG analysis is about 25.54%; and g. The white ITH powders are placed into the high-temperature oven and calcined under the following conditions: heating rate 10° C./min to 800° C. for 3 hours. After calcining, ITO powders are obtained.

Fourth Embodiment (Inorganic Salts made from Spent ITO Targets)

a. 10.03 g spent ITO target is dissolved in 100 mL concentrated hydrochloric acid (37 wt %) and then filtrating the solution to remove un-dissolved substances. The indium/tin ratio is 15 according to the inductively coupled plasma atomic emission spectrometry. The 150 mL solution is obtained after adding proper amount of water;

a1. 6.10 g tin chloride (including five crystalline water molecules, purity 99%, molecular weight 350.50) are dissolved in water to form a 25 mL clear solution;

b. Mixing the two solution bodies and stirring. In this stage, the molar ratio of indium to tin is 9:1;

c. In a stirring status, rapidly adding 150 mL concentrated (25 wt %) ammonia into the admixed solution to adjust the pH value of the admixed solution to 7.30. Upon reaching the pre-selected pH, the clear solution turns into white solution and precipitants produce;

c1. The solution containing white precipitants is stirred for at least 12 hours;

d. Water in the solution processed by step a through c1 is removed by using filtration method. A white filter cake is then obtained after filtration. The white filter cake is re-dispersed in DI water by stirring. This step is repeated three times. After finishing the last filtration, the filter cake is re-dispersed in DI water to form suspended solution having a total volume of 175 mL;

e. 5 mL concentrated nitric acid (70 wt %) is added into the suspended solution of step d to adjust pH of the solution to 3.50 and the solution is stirred for 24 hours;

e1 According to particle size analysis the diameter of the particles in the solution is 127 nm;

f. After drying the peptized suspended solution of step e by spray drying method, white indium tin hydroxide (ITH) powders are obtained. In this case, 9.64 g of ITH powders are obtained. The loss ratio according to TG analysis is about 25.15%; and g. The white ITH powders are placed into the high-temperature oven and calcined under the following conditions: heating rate 10° C./min to 800° C. for 3 hours. After calcining, ITO powders are obtained.

Fifth Embodiment (This Invention)

(1) 50 g ITO powders prepared according to the second embodiment as described above are placed in a 1L pot with ball milling. 50 g water is then added to form slurry of concentration of 50 wt %. The slurry is ball milled for 24 hours;

(2) Dry the slurry to form ball milled ITO powders;

(3) Place the powders into a 1.6 inch die. After treated with cold pressing and cold isostatic pressing, a green body of ITO target is obtained; and (4) The ITO target green body is placed into a high temperature oven or furnace and heated under the following conditions:

Step 1: ramp up the temperature of the furnace from room temperature to 800~1200° C. at a heating rate of 1~15° C./min;

Step 2: Raise the temperature of the furnace from 800~1200° C. to 1400~1600° C. at a heating speed of 0.5~15° C./min and holding the temperature at 1400~1600° C. for 3~54 hours. Meanwhile, injecting 0.6~1.5 atm oxygen into the furnace;

Step 3: Lower the temperature of the furnace from 1400~1600° C. to 800~1200° C. at the speed of 0.5~15° C./min and maintaining the oxygen pressure at 0.6~1.5 atm; and Step 4: upon reaching 800~1200° C., the furnace is naturally cooled down to room temperature.

(5) The 1.3 inch target is obtained and according to Archimedes method the density of the target is 96%.

Sixth Embodiment (In Comparison with this Invention)

(1) 45 g commercial indium oxide powders and 5 g tin oxide powders are placed in a 1L pot with ball milling. 50 g water is then added to form slurry of concentration of 50 wt %. The slurry is ball milled for 24 hours;

(2) Dry the slurry to form ball milled ITO powders;

(3) Place the powders into a 1.6 inch die. After treated with cold pressing and cold isostatic pressing, a green body of ITO target is obtained; and (4) The ITO target green body is placed into a high temperature oven or furnace and heated under the following conditions:

Step 1: ramp up the temperature of the furnace from room temperature to 800~1200° C. at a heating rate of 1~15° C./min;

Step 2: Raise the temperature of the furnace from 800~1200° C. to 1400~1600° C. at a heating speed of 0.5~15° C./min and holding the temperature at 1400~1600° C. for 3~54 hours. Meanwhile, injecting 0.6~1.5 atm oxygen into the furnace;

Step 3: Lower the temperature of the furnace from 1400~1600° C. to 800~1200° C. at the speed of 0.5~15° C./min and maintaining the oxygen pressure at 0.6~1.5 atm; and Step 4: upon reaching 800~1200° C., the furnace is naturally cooled down to room temperature (5) The 1.3 inch target is obtained and according to Archimedes method the density of the target is 95%.

Figure 2:
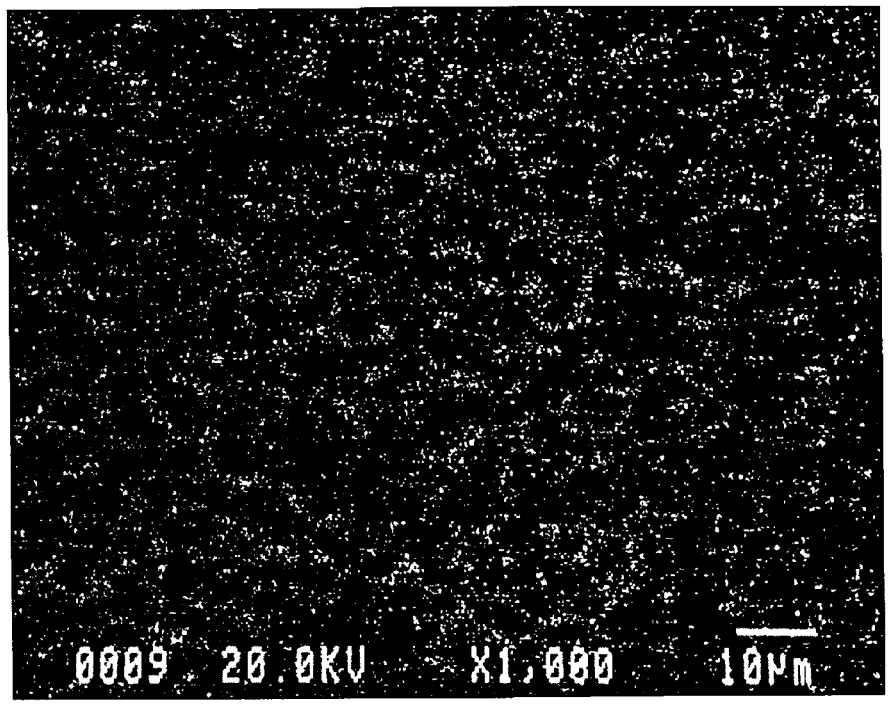
FIG. 2 is an EPMA picture according to Fifth Embodiment.
Figure 3:
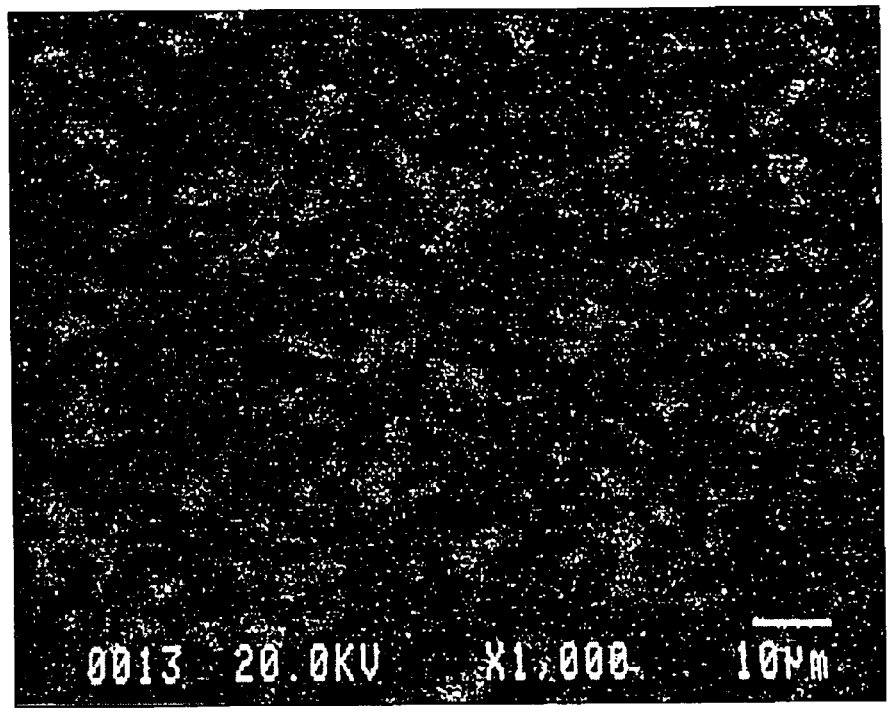
FIG. 3 is an EPMA picture according to Sixth Embodiment.

Result Comparison:

Referring to FIG. 2 and FIG. 3 of indium/tin distribution obtained by electron probe microanalysis (EPMA) according to Fifth Embodiment and Sixth Embodiment, respectively. The white spots indicate the distribution of the tin oxides. It is clear that tin oxide distribution of the target made from powders prepared according to Second Embodiment is better than that obtained by traditional solid-state target preparation method.

One of the features of this invention is that the powder homogeneity is improved by peptization. Aggregation of the hydroxyl compounds is inhibited during peptizing process as described above. This can be proved by the particle size difference between the Second Embodiment and the Third Embodiment (142 nm and 2350 nm respectively). According to the above experimental results, the First, Second, and Fourth Embodiments can achieve the goal of the present invention. The three materials produced in the First, Second, and Fourth Embodiments can be processed further by the Fifth Embodiment and Sixth Embodiment to form a target product having superior properties.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A solution method for preparing indium-tin oxide (ITO) powders, the solution method comprising the following steps:
   a. dissolve indium compounds and tin compounds in water respectively to form two solution bodies having indium concentration and tin concentration ranging from 0.1M to 5.0M;
   b. blend the two solution bodies by stirring;
   c. adding proper amount of alkaline reagents to adjust pH value of the admixed solution in step b to complete precipitation wherein the concentration of the alkaline reagents ranges from 1N to 12N and the pH value ranges from 3 to 9;
   d. water in the solution processed by step a through c is removed by filtration wherein a white filter cake is then obtained after filtration, and the white filter cake is re-dispersed in DI water by stirring, and wherein step d is repeated at least two times to form a suspended solution;
   e. the suspended solution after treatment by step d is then mixed with acids to control the pH value of the solution, and then stirred to peptize the suspended solution for a determined time period, wherein the concentration of the acids ranges from 1N to 15N, the pH value is adjusted in the range from 1 to 6, and the determined time period is between 2 to 72 hours;
   f. the peptized solution in step e is then dried to obtain white powder of indium tin hydroxide (ITH), wherein the drying method may be heating or spray drying; and
   g. the dry ITH powders are then placed into a high temperature oven, wherein, ITO powder is obtained, and wherein the ITH powder is heated at 1 to 20° C./min to a temperature of between 300° C. and 1100° C. and held for 0.5 to 5 hours.

2. The method of claim 1 wherein the indium compounds and the tin compounds are made from spent sputtering target dissolved in a second acid.

3. The method of claim 2 wherein the second acid are selected from the group consisting of concentrated nitric acid, hydrochloric acid, and of mixture of concentrated nitric acid and hydrochloric acid.

4. The method of claim 1 wherein the indium compounds and the tin compounds are obtained by dissolving metal indium and tin respectively in a dissolving acids.

5. The method of claim 4 wherein the dissolving acid is nitric acid and the indium compounds comprise indium nitrate.

6. The method of claim 4 wherein the tin compounds comprise tin chloride.

7. The method of claim 1 wherein the alkaline reagent is ammonia or alkyl-ammonium compound.

8. The method of claim 7 wherein the alkyl ammonium compound is tetramethyl ammonium hydroxide.

9. The method of claim 1 wherein the step c further comprises a step of stirring.

10. The method of claim 1 wherein in step e the acid comprises nitric acid, hydrochloric acid, acetic acid, oxalic acid, or formic acid.

11. The method of claim 1 wherein the drying method of step f is implemented in an even or a spray dryer.

12. A solution method for preparing indium-tin oxide powders, the solution method comprising the following steps:
   a. dissolve indium metal compounds and tin metal in water respectively to form two solution bodies;
   b. mix the two solution bodies by stirring;
   c. adding proper amount of alkaline reagents to adjust pH value of the admixed solution in step b to complete precipitation;
   d. water in the solution processed by step a through c is removed by method filtration method, a white filter cake is then obtained after filtration, and the white filter cake is re-dispersed in DI water by stirring, and wherein step d is repeated at least two times to form a suspended solution;
   e. the suspended solution after treatment by step d is then mixed with acids to control the pH value of the solution, and then stirred to peptize the suspended solution;
   f. the peptized solution in step e is then dried to obtain white powder of indium tin hydroxide (ITH); and
   g. the dry ITH powders is then placed into a high temperature oven, wherein, ITO powder is obtained.

* * * * *